(12) United States Patent
Sugiyama

(10) Patent No.: US 10,308,082 B2
(45) Date of Patent: Jun. 4, 2019

(54) RUN-FLAT TIRE

(71) Applicant: SUMITOMO RUBBER INDUSTRIES, LTD., Kobe-shi, Hyogo (JP)

(72) Inventor: Naoki Sugiyama, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 662 days.

(21) Appl. No.: 14/418,788

(22) PCT Filed: Jun. 25, 2013

(86) PCT No.: PCT/JP2013/067378
§ 371 (c)(1),
(2) Date: Jan. 30, 2015

(87) PCT Pub. No.: WO2014/030424
PCT Pub. Date: Feb. 27, 2014

(65) Prior Publication Data
US 2015/0210123 A1    Jul. 30, 2015

(30) Foreign Application Priority Data

Aug. 21, 2012 (JP) .................................. 2012-182648

(51) Int. Cl.
*B60C 17/00* (2006.01)
*B29D 30/12* (2006.01)
(Continued)

(52) U.S. Cl.
CPC .......... *B60C 17/0009* (2013.01); *B29D 30/12* (2013.01); *B60C 3/00* (2013.01);
(Continued)

(58) Field of Classification Search
CPC ....... B60C 17/0009; B60C 3/00; B60C 9/023; B60C 15/00; B60C 15/0018; B60C 17/0045; B29D 30/12
See application file for complete search history.

(56) References Cited

U.S. PATENT DOCUMENTS 5,016,697 A * 5/1991 Noma ....................... B60C 3/04
152/454
5,988,247 A * 11/1999 Tanaka ...................... B60C 9/18
152/517
(Continued)

FOREIGN PATENT DOCUMENTS

JP    2003-191725 A    7/2003
JP    2003-311741 A   11/2003
(Continued)

OTHER PUBLICATIONS

Tyre Construction, http://what-when-how.com/automobile/tyre-construction-automobile/, Nov. 3, 2011.*
(Continued)

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

It is a run-flat tire 1 provided with a carcass 6 extending from a tread portion 2 through a sidewall portion 3 to a bead core 5 in a bead portion 4, and a side-reinforcement rubber layer 10 disposed inside the carcass 6 in the sidewall portion 3 and having a substantially crescent-shaped cross-section. In a tire meridian cross section including the tire rotational axis under a normal state such that the tire is mounted on a normal rim, inflated to a normal internal pressure and loaded with no load, the tire inner-cavity surface 11 includes a side inner-cavity surface 12. A distance in the tire radial direction of the side inner-cavity surface 12 from a bead toe 4e of the bead portion 4 is in a range of 0.4 times to 0.9 times the length H in the tire radial direction of the tire inner-cavity surface 11. The side inner-cavity surface 12 includes a smooth surface 15 which does not have unevenness, and the
(Continued)

total surface area of the smooth surface 15 is more than 90% of the total area of the side inner-cavity surface 12.

10 Claims, 8 Drawing Sheets

(51) Int. Cl.
| | | |
|---|---|---|
| *B60C 9/02* | (2006.01) | |
| *B60C 3/00* | (2006.01) | |
| *B60C 5/12* | (2006.01) | |
| *B60C 13/00* | (2006.01) | |
| *B60C 15/00* | (2006.01) | |
| *B29D 30/20* | (2006.01) | |

(52) U.S. Cl.
CPC ............... *B60C 5/12* (2013.01); *B60C 9/023* (2013.01); *B60C 13/00* (2013.01); *B60C 15/00* (2013.01); *B60C 15/0018* (2013.01); *B60C 17/0045* (2013.01); *B29D 2030/201* (2013.01); *B60C 2013/026* (2013.01); *B60C 2017/0063* (2013.01)

(56) References Cited

U.S. PATENT DOCUMENTS

| | | | | |
|---|---|---|---|---|
| 6,113,833 | A * | 9/2000 | Ogawa | B29D 30/12 |
| | | | | 156/110.1 |
| 2005/0205187 | A1* | 9/2005 | Suzuki | B60C 9/09 |
| | | | | 152/517 |
| 2006/0113019 | A1* | 6/2006 | Hasegawa | B60C 5/14 |
| | | | | 152/510 |
| 2007/0131329 | A1* | 6/2007 | Miyazaki | B60C 9/08 |
| | | | | 152/517 |
| 2010/0140847 | A1* | 6/2010 | Secchi | B29D 30/0605 |
| | | | | 264/334 |

FOREIGN PATENT DOCUMENTS

| | | |
|---|---|---|
| JP | 2004-17668 A | 1/2004 |
| JP | 2004-98714 A | 4/2004 |
| JP | 2006-151328 A | 6/2006 |
| JP | 2007-253412 A | 10/2007 |
| JP | 2010-155576 A | 7/2010 |
| JP | 2011-161896 A | 8/2011 |
| JP | 2012-30503 A | 2/2012 |
| JP | 2012-106441 A | 6/2012 |

OTHER PUBLICATIONS

Wojdyla, Ben. "Should you put low-profile tires on your car?" http://www.popularmechanics.com/cars/how-to/a7398/should-you-put-low-profile-tires-on-your-new-car/, Feb. 24, 2012.*

International Search Report, issued in PCT/JP2013/067378, dated Aug. 13, 2013.

* cited by examiner

RUN-FLAT TIRE

TECHNICAL FIELD

The present invention relates to a run-flat tire capable of running for a relatively long distance in a punctured state.

BACKGROUND ART

A run-flat tire provided in a sidewall portion with a side-reinforcement rubber layer whose cross section is crescent-shaped has been proposed. When the inner pressure is decrease by a puncture, the side-reinforcement rubber layer supports the load of the tire, and the deflection of the tire is prevented. such run-flat tire is able to run for a relatively long distance in a punctured state (hereinafter, referred to by "run-flat running" in some situations).

During run-flat running, deformation and restoration of the side-reinforcement rubber layer occur repeatedly, and the side-reinforcement rubber layer c generates heat. If the temperature of the side-reinforcement rubber layer becomes high, breakage occurs. Accordingly, a run-flat tire in which breakages resulting from heat are hard to occur is desired.

In order to solve the above problem, there has been proposed a run-flat tire in which rubber having a high thermal conductivity is used for a side-reinforcement rubber layer. This run-flat tire is further provided in the outer surface of the sidewall portion with a large number of concavo-convex patterns (for example, undermentioned patent document 1). In such run-flat tire, a rise in the temperature of the side-reinforcement rubber layer is suppressed. As the outer surface of the sidewall portion of this run-flat tire is provided with a large surface area owing to the concavo-convex patterns, the sidewall portion is improved in the radiation performance.

Patent document 1: Japanese Patent Application Publication No. 2010-155576

However, the durability of the run-flat tire is required to be further improved.

SUMMARY OF THE INVENTION

Problems to be Solved by the Invention

The present invention was thought out with the view to the above-mentioned problems, and a primary object is to improve the run-flat durability by suppressing heat accumulation in a sidewall portion, essentially, by making a major portion of the tire inner-cavity surface as a smooth surface.

Means of Solving the Problems

The present invention is a run-flat tire which is provided with a carcass extending from a tread portion through a sidewall portion to a bead core in a bead portion, and a side-reinforcement rubber layer disposed inside the carcass in the sidewall portion and having a substantially crescent-shaped cross-section, and which is characterized in that in a tire meridian cross section including the tire rotational axis under a normal state such that the tire is mounted on a normal rim, inflated to a normal internal pressure and loaded with no load, the tire inner-cavity surface includes a side inner-cavity surface, a distance in the tire radial direction of the side inner-cavity surface from a bead toe of the bead portion is in a range of 0.4 times to 0.9 times a cavity surface height H which is the length in the tire radial direction of the tire inner-cavity surface, the side inner-cavity surface includes a smooth surface which does not have unevenness, and the total surface area of the smooth surface is more than 90% of the total area of the side inner-cavity surface.

In the run-flat tire relating to the present invention, preferably, the total surface area of the smooth surface is not less than 96% of the total area of the side inner-cavity surface.

In the run-flat tire relating to the present invention, preferably, the total surface area of the smooth surface is not less than 98% of the total area of the side inner-cavity surface.

In the run-flat tire relating to the present invention, preferably, the tire inner-cavity surface is formed with a rigid core having an outer surface which substantially accords with the shape of the tire inner-cavity surface, the rigid core is constructed by successively arranging segments divided in the tire circumferential direction, and in the tire inner-cavity surface, there are formed burrs suctioned into gaps between the segments adjacent in the tire circumferential direction.

In the run-flat tire relating to the present invention, preferably, the side-reinforcement rubber layer is disposed in a range of 0.15 times to 0.9 times the cavity surface height H from the bead toe.

In the run-flat tire relating to the present invention, the tire inner-cavity surface includes the side inner-cavity surface, a tread inner-cavity surface on the outside in the tire radial direction of the side inner-cavity surface, and a bead inner-cavity surface on the inside in the tire radial direction of the side inner-cavity surface, and it is preferable that the percentage of the area of a smooth surface of each inner-cavity surface satisfies the following relationship.

side inner-cavity surface>tread inner-cavity surface>bead inner-cavity surface

Effects of the Invention

The run-flat tire of the present invention is provided in the side inner-cavity surface with the smooth surface which does not have unevenness. The total surface area of the smooth surface is more than 90% of the total area of the side inner-cavity surface. Therefore, local heat accumulation in the sidewall portion during run-flat running is prevented. Consequently, the run-flat durability is improved.

MODE FOR CARRYING OUT THE INVENTION

A mode for carrying out the present invention will now be described in detail in conjunction with the drawings.

Figure 1:
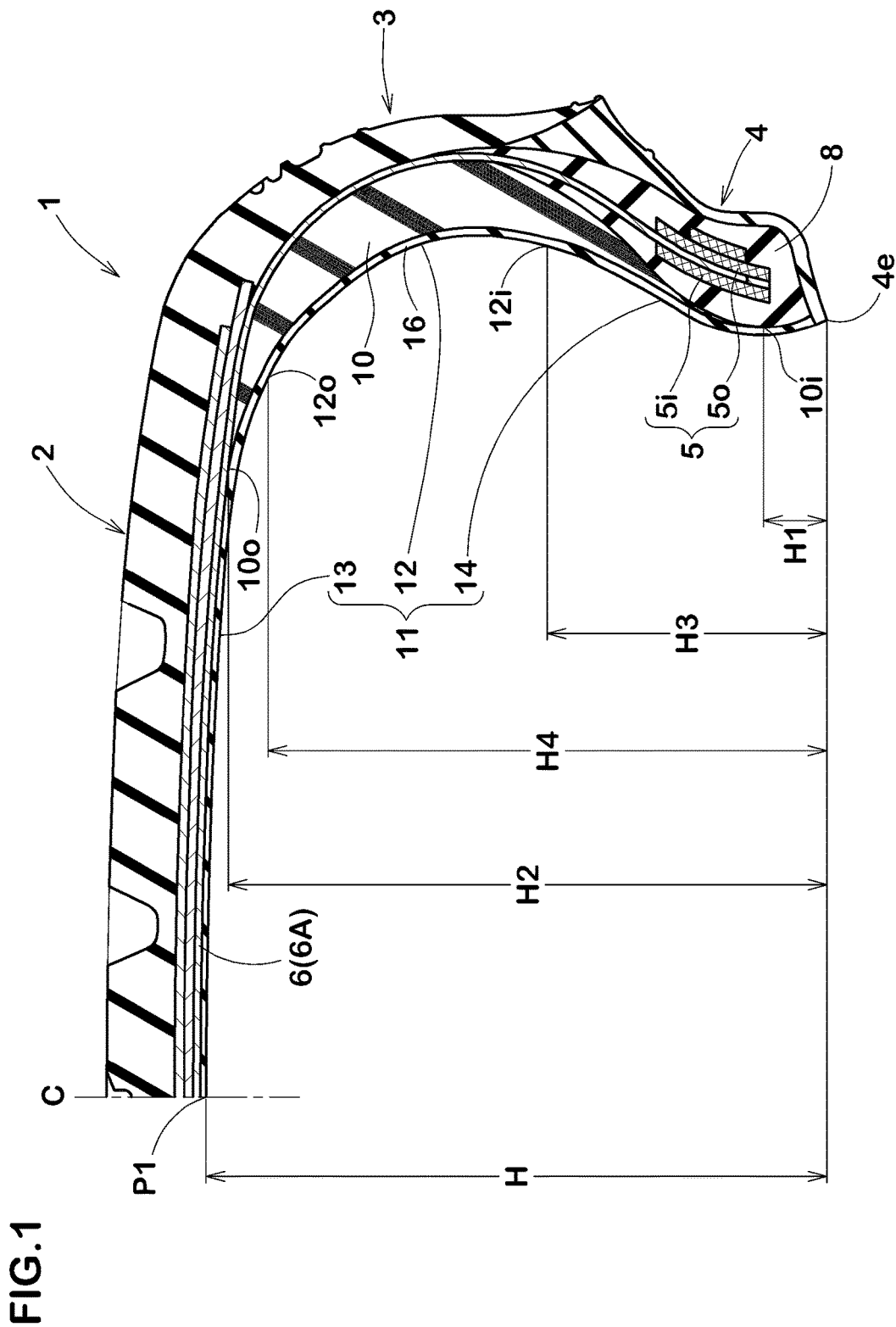
FIG. 1 a cross sectional view of a run-flat tire showing an embodiment of the present invention FIG. 2 a perspective view showing the tire inner-cavity surface of the run-flat tire of FIG. 1

FIG. 1 is a tire meridian cross sectional view including the tire rotational axis, of a run-flat tire 1 in this embodiment (hereinafter, simply called "tire" depending on circumstances) under the normal state.

Here, the normal state is a state of the tire 1 which is mounted on a normal rim (not shown), inflated to a normal internal pressure and loaded with no load.

Dimensions and the like of various portions of the tire refer to values measured under the normal state unless otherwise noted.

The "normal rim" is a wheel rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the run-flat tire 1 in this embodiment is provided with
a carcass 6 extending from a tread portion 2 through a sidewall portion 3 to a bead core 5 in a bead portion 4,
a side-reinforcement rubber layer 10 disposed on the inside in the tire axial direction, of the carcass 6 in the sidewall portion 3,
a bead apex rubber 8 disposed in the bead portion 4, and an inner liner 16 disposed in a tire inner-cavity surface 11.
In this embodiment, a run-flat tire for passenger car is shown, and a symbol C denotes the tire equator.

The carcass 6 is formed from a ply of radially arranged organic fiber carcass cords. The carcass 6 in this embodiment is composed of a single carcass ply 6A. The carcass ply 6A has a toroidal shape, extending between both bead portions 4, 4.
Each end portion of the carcass ply 6A reaches to the bead core 5.
The bead core 5 in this embodiment is composed of inner and outer bead core pieces 5i, 5o in the tire axial direction. Each end portion of the carcass ply 6A is sandwiched between the bead core pieces 5i, 5o and terminates.

The bead apex rubber 8 is made of hard rubber, and extends outwardly in the tire radial direction from a vicinity of a bead toe 4e in a tapered manner. The bead toe 4e means an inner end portion in the tire axial direction and the inner end in the tire radial direction of the bead portion 4. The bead portion 4 and the sidewall portion 3 are reinforced by such bead apex rubber 8.

The side-reinforcement rubber layer 10 is made of hard rubber, and has a substantially crescent-shaped cross-sectional shape. Namely, the side-reinforcement rubber layer 10 is curved along the sidewall portion 3, and extends from a central portion toward the inner end 10i and the outer end 10o in the tire radial direction in a tapered manner. The side-reinforcement rubber layer 10 increases the rigidity of the sidewall portion 3 so as to effectively decrease the vertical deflection of the tire during run-flat running.

The region where the side-reinforcement rubber layer 1 is disposed, is preferably in a range from 0.1 times to 0.95 times, more preferably in a range of not more than 0.15 times and not less than 0.90 times a cavity surface height H from the bead toe 4e.
In FIG. 1, the inner end 10i of the side-reinforcement rubber layer 10 is positioned at a height H1 from the bead toe 4e, and the outer end 10o of the side-reinforcement rubber layer 10 is positioned at a height H2 from the bead toe 4e.

Here, the cavity surface height H means the length in the tire radial direction of the tire inner-cavity surface 11, which is expressed by the distance in the tire radial direction from the bead toe 4e to the radially outermost position P1 of the tire inner-cavity surface 11.

By disposing the side-reinforcement rubber layer 10 in the above-mentioned region, the sidewall portion 3 and the bead portion 4 are effectively reinforced in the bending rigidity, and the run-flat durability is improved.

In order to improve the run-flat performance without decreasing the ride comfort during normal running, the complex elastic modulus $E^*$ of the side-reinforcement rubber layer 10 is preferably not less than 5 MPa, more preferably not less than 7 MPa, but preferably not more than 40 MPa, more preferably not more than 30 MPa.

In this specification, the complex elastic modulus $E^*$ of rubber is a value measured according to the provisions of JIS-K6394 under the following conditions by the use of a viscoelastic spectrometer manufactured by (KK) Iwamoto seisakusyo.
 initial strain: 10%
 amplitude: +/−2%
 frequency: 10 Hz
 deformation mode: tensile
 measuring temperature: 70 degrees C.

The inner liner 16 is disposed so as to extend between the bead portions 4, 4 in a toroidal form in order to retain the air in the tire inner cavity. Accordingly, the inner liner 16 forms the tire inner-cavity surface 11. For the inner liner 16, a gas-impermeable rubber compound, for example, butyl rubber, halogenated butyl rubber, brominated butyl rubber and the like is used.

Figure 2:
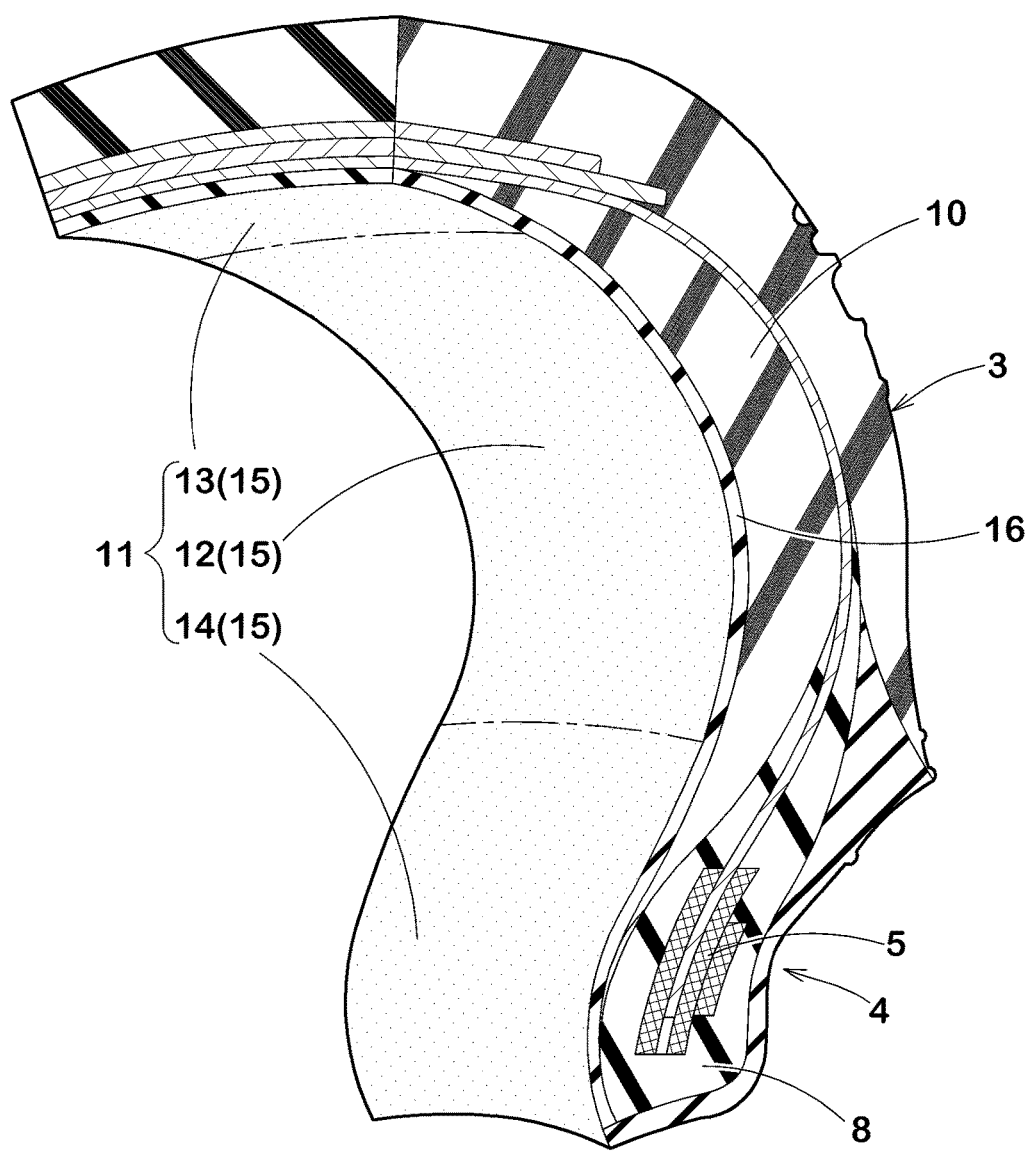

FIG. 2 shows a perspective view of the tire inner-cavity surface 11 shown in FIG. 1.
As shown in FIG. 1 and FIG. 2, the tire inner-cavity surface 11 includes a side inner-cavity surface 12 on the inside of the sidewall portion 3, a tread inner-cavity surface 13 on the inside of the tread portion 2, and a bead inner-cavity surface 14 inside the side inner-cavity surface 12 in the tire radial direction.

As shown in FIG. 1, the distance of the side inner-cavity surface 12 from the bead toe 4e in the tire radial direction is in a range of 0.4 times to 0.9 times the cavity surface height H. That is, the distance H3 in the tire radial direction, of the inner end 12i in the tire radial direction of the side inner-cavity surface 12 from the bead toe 4e is 0.4 times the cavity surface height H.
And, the distance H4 in the tire radial direction, of the outer end 12o in the tire radial direction, of the side inner-cavity surface 12 from the bead toe 4e is 0.9 times the cavity surface height H.

The tread inner-cavity surface 13 is a region radially outside the outer end 12o of the side inner-cavity surface 12.

In the run-flat tire 1 of the present invention, as shown in FIG. 2, the side inner-the cavity surface 12 includes a smooth surface 15 which does not have unevenness.
The total surface area S1 of the smooth surface 15 in the side inner-cavity surface 12 is more than 90% of the total area Ss of the side inner-cavity surface 12.

Figure 8:
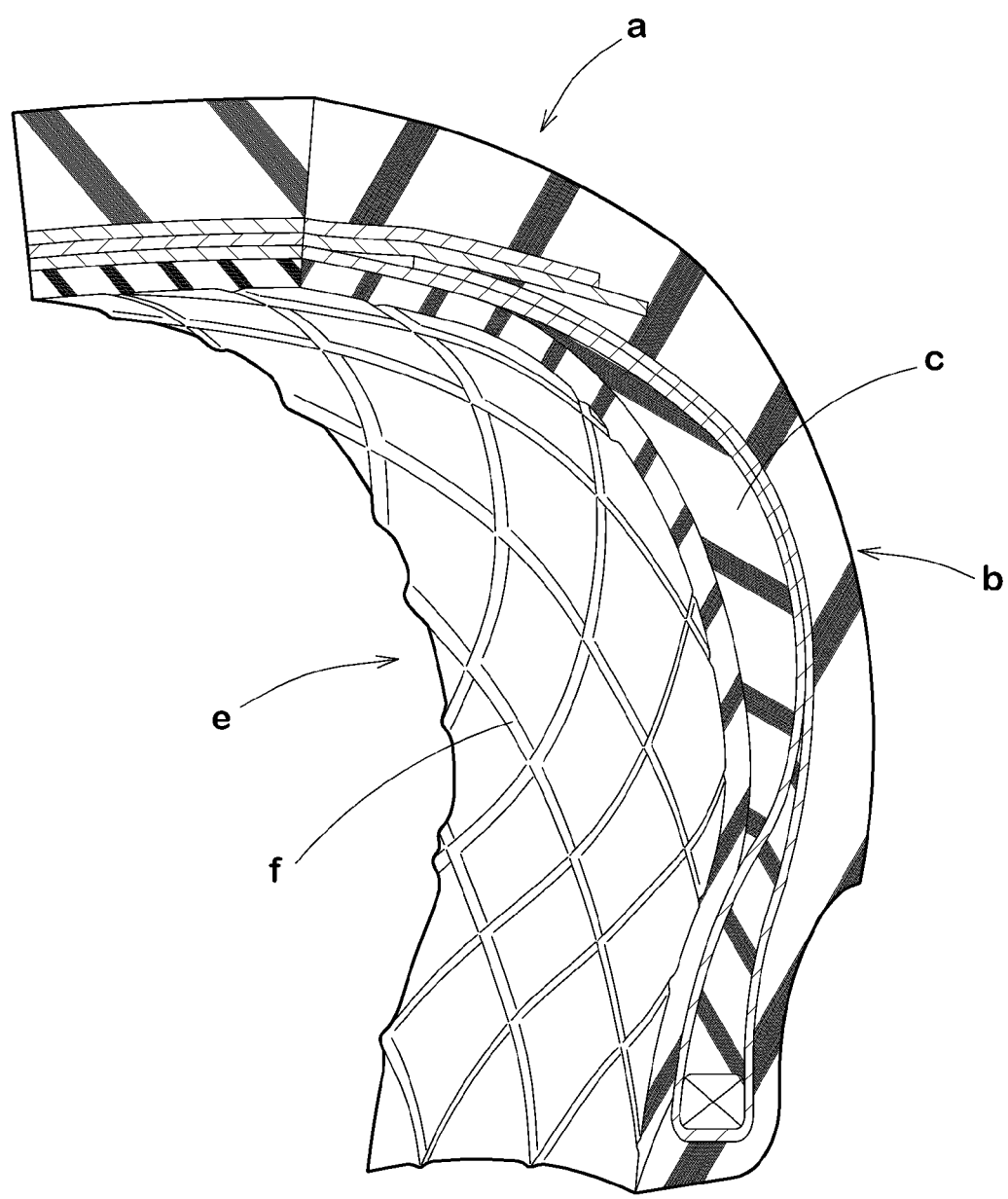

In a run-flat tire which is, as shown in FIG. 8, provided in the tire inner-cavity surface e with rib-like locally convexed parts f, there is a possibility that the run-flat durability is decreased. As the convexed parts f add a large volume of rubber to the tire inner-cavity surface e, the heat in the sidewall portions is liable to be accumulated. Although the convexed parts f increase the surface area of the tire inner-cavity surface e, they do not contribute to an improvement in the radiation performance because the tire inner-cavity surface e does not contact with external air.

The run-flat tire of the present invention has no convexed parts or the volume of convexed parts is very small in comparison with the comparative example tire shown in FIG. 8. Consequently, in the run-flat tire 1 of the present invention, the heat does not locally accumulated in the convexed parts of the sidewall portions 3, and the run-flat durability is improved.

The "smooth surface which does not have unevenness-"means a surface which is flat and smooth and from which unevenness is eliminated, and for example, it is a part other than convexed parts formed by vent lines and the like of a mold or bladder.

If the total surface area of the smooth surface 15 is larger, the partial accumulation of the heat in the sidewall portion 3 is more suppressed. Consequently, the total surface area S1 of the smooth surface 15 in the side inner-cavity surface 12 is preferably not less than 96%, more preferably not less than 98% of the total area Ss of the side inner-cavity surface 12.

In the tread inner-cavity surface 13, if the percentage of the smooth surface 15 is large, there is a tendency that, during vulcanizing the tire, air is easily remained on the tread inner-cavity surface 13. Such air might lead to defective molding and deterioration in the uniformity and the appearance of the tire inner-cavity surface 11.

Figure 3:
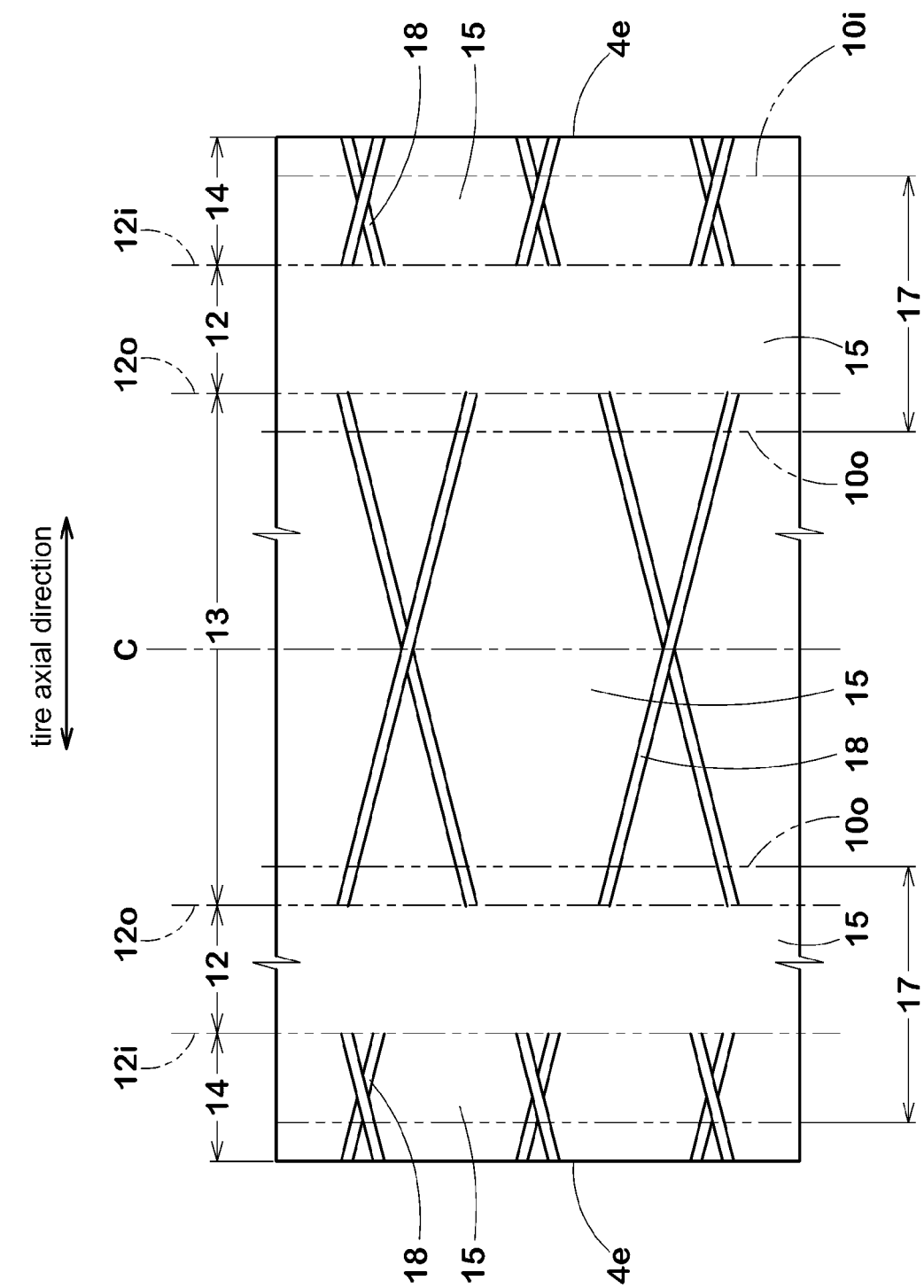
FIG. 3 a developed plan view of the tire inner-cavity surface of another embodiment FIG. 4 a perspective view of the rigid core FIG. 5 a diagram for explaining a step of applying tire constructional members onto the rigid core FIG. 6 a cross sectional view of an unvulcanized tire and the rigid core FIG. 7 a cross sectional view showing a vulcanization step FIG. 8 a perspective view showing the tire inner-cavity surface of a run-flat tire of a comparative example

In a preferable embodiment, as shown in FIG. 3, it is desirable that the tread inner-cavity surface 13 is made smaller in the percentage of the area of the smooth surface 15 than the side inner-cavity surface 12 by the inclusion of convexed parts 18 formed by vent lines and the like.

In particular, the total surface area S2 of the smooth surface 15 in the tread inner-cavity surface 13 is preferably not less than 85%, more preferably not less than 88%, but preferably not more than 95%, more preferably not more than 92% of the total area St of the tread inner-cavity surface 13.

During vulcanizing the tire, air is liable to remain on the bead inner-cavity surface 14. Consequently, it is preferable that the bead inner-cavity surface 14 is made smaller in the percentage of the area of the smooth surface 15 than the side inner-cavity surface 12 and the tread inner-cavity surface 13 by the inclusion of convexed parts 18 formed by vent lines and the like.

In particular, the total surface area S3 of the smooth surface 15 in the bead inner-cavity surface 14 is preferably not less than 80%, more preferably not less than 83%, but preferably not more than 90%, more preferably not more than 87% of the total area Sb of the bead inner-cavity surface 14. such bead inner-cavity surface 14 suppresses the defective moldings while maintaining the run-flat durability.

In this embodiment, accordingly, the percentage of the smooth surface 15 in each of the cavity surfaces 12, 13 and 14 is set as follows.

> side inner-cavity surface 12>tread inner-cavity surface 13>bead inner-cavity surface 14

A reinforcing layer inner-cavity surface 17 of the tire inner-cavity surface 11 which is the tire inner-cavity surface between an inner end 10i and an outer end 10o in the tire radial direction of the side-reinforcement rubber layer 10, is most liable to generate heat. Accordingly, it is preferable to make the area of the smooth surface 15 in the reinforcing layer inner-cavity surface 17 larger. For example, the total surface area S4 of the smooth surface 15 in the reinforcing layer inner-cavity surface 17 is preferably not less than 95%, more preferably not less than 97% of the total area Sr of the reinforcing layer inner-cavity surface 17.

Thereby, partial heat accumulation in the reinforcing layer inner-cavity surface 17 is further suppressed, and the run-flat durability is improved.

Next, an example of the method for manufacturing the run-flat tire 1 in this embodiment will be explained.

Figure 4:
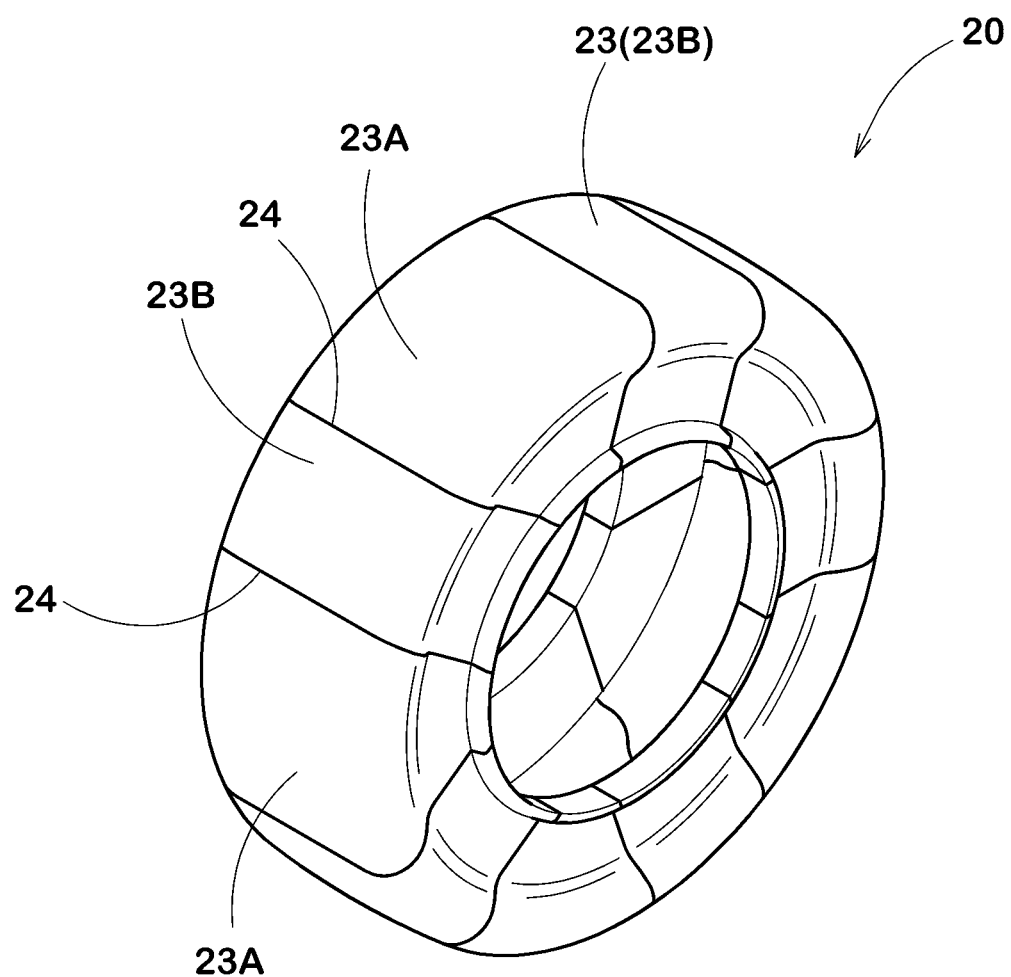

In this embodiment, in order to manufacture the run-flat tire, a rigid core 20 is used. As shown in FIG. 4, the rigid core 20 has an outer surface which substantially accords with the shape of the tire inner-cavity surface. The rigid core 2 is constructed by successively arranging a plurality of segments 23 divided in the tire circumferential direction. The segments 23 are made up of first and second segments 23A, 23B disposed alternately in the circumferential direction. A surface of each segment 23A, 23B forming the side inner-cavity surface is made smooth by polishing.

Onto the outer surface of the rigid core 20, unvulcanized tire constructional members are sequentially applied, and thereby an unvulcanized tire is formed.

The constructional members include the inner liner 16, the side-reinforcement rubber layer 10, the carcass ply 6A and so on.

Figure 5:
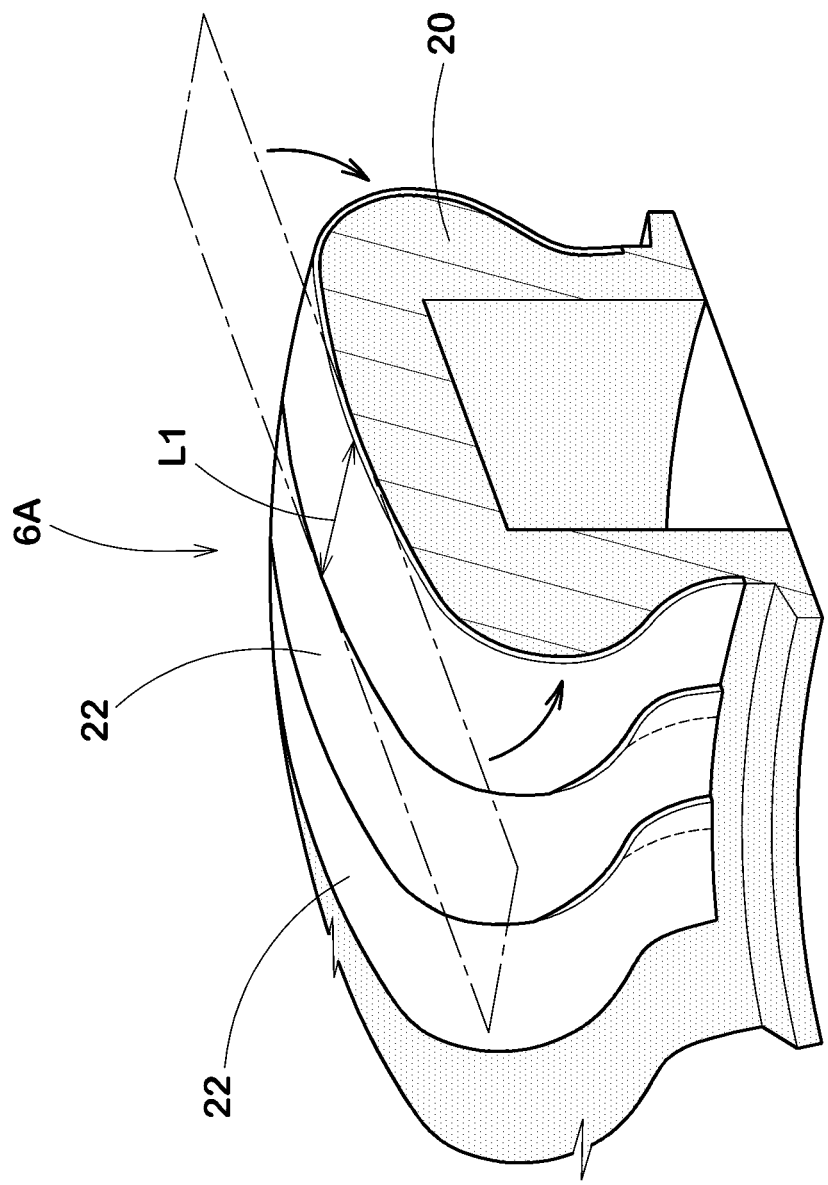
Figure 6:
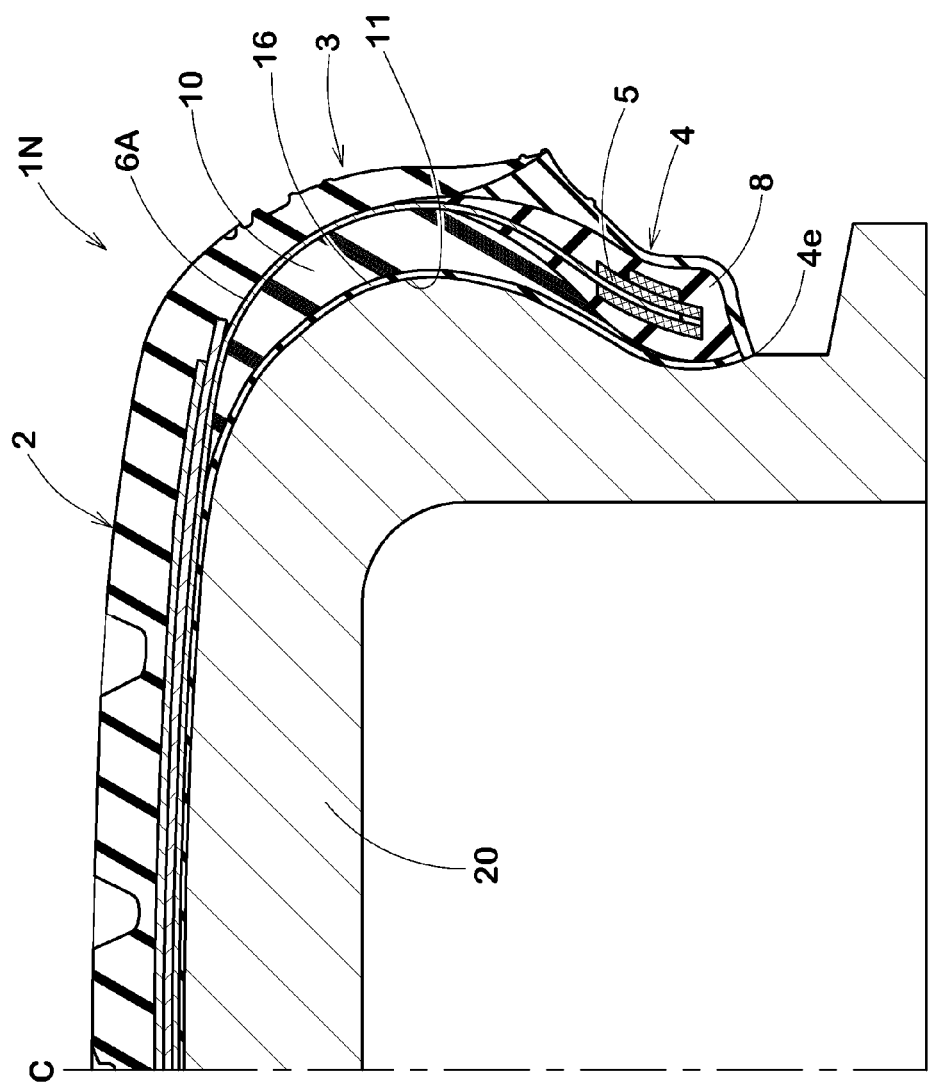

For example, in the event of the carcass ply 6A being formed, as shown in FIG. 5, a strip-shaped ply piece 22 whose length L1 in the tire circumferential direction is small is applied onto the outer surface of the rigid core 20. By applying a plurality of the ply pieces 22 in series in the tire circumferential direction, the carcass ply 6A is formed. Then, as shown in FIG. 6, the unvulcanized tire 1N is formed on the rigid core 20.

Figure 7:
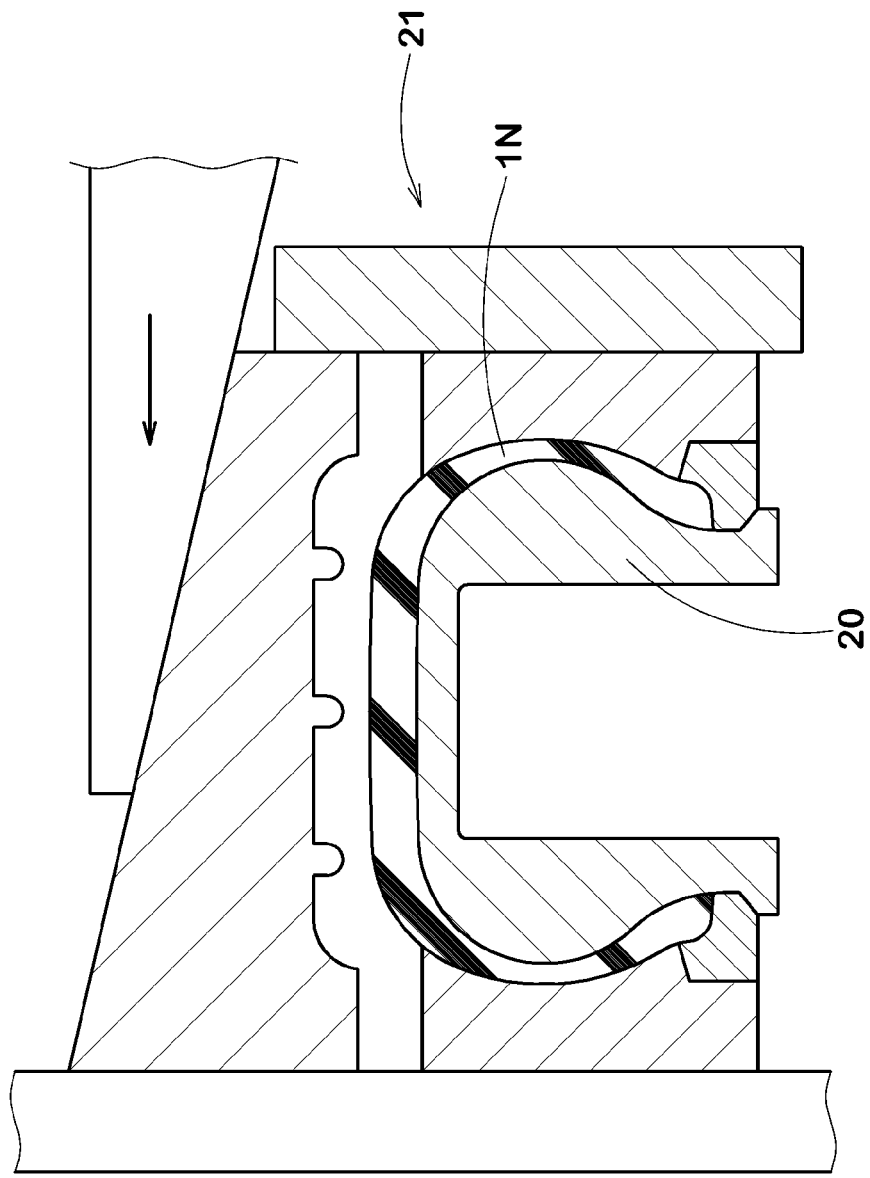

As shown in FIG. 7, the unvulcanized tire 1N is vulcanization-molded within a vulcanization mold 21 together with the rigid core 20.

In the manufacturing method using the rigid core 20, as the tire inner-cavity surface is fitted to the outer surface of the core from the beginning, a possibility of air being remained becomes less in comparison with that using a bladder. Accordingly, it may be possible to form, for example, the entire side inner-cavity surface 12 as being a smooth surface. The rigid core 20 might suction up a part of the rubber in the side inner-cavity surface 12 into gaps 24 between the segments 23A, 23B so as to form membranous burrs. However, such burrs do not become a factor for breakages of the rubber member in substance. In addition, the percentage of the burrs is very small in comparison with the convexed parts formed by the vent lines. Accordingly, the use of the rigid core 20 makes it possible to form the run-flat tire 1 whose tire inner-cavity surface 11 is smooth, with high accuracy.

While description has been made of the run-flat tire of the present invention, the present invention can be carried out by modifying into various embodiments without being limited to the above-described concrete embodiment.

Embodiments

Run-flat tires of 245/40R17 for passenger car making up the basic structure of FIG. 1 were experimentally manufactured according to specifications in Table 1, and tested for the run-flat durability.

The test tires included tires having a tire inner-cavity surface manufactured with a bladder (indicated as A in Table 1), and tires having a tire inner-cavity surface manufactured with the rigid core (indicated as B in Table 1).

[Tire A]

In the tire inner-cavity surface, convexed parts were formed by vent lines formed on the bladder. The convexed part was like a 0.5 mm height 0.5-1.0 mm width rib.

When the tire inner-cavity surface was developed as shown in FIG. 3, the convexed parts extended, inclining at 0 to 10 degrees with respect to the tire axial direction.

[Tire B]

The tire inner-cavity surface had no convexed part. In the tire inner-cavity surface of the tire B, membranous burrs were formed.

Test methods were as follows.

<Run-flat Durability>

The test tire was mounted on a drum type running tester, and run-flat running was carried out on the drum. The running distance until the test tire was broken was measured. The results are index numbers based on the running distance of the comparative example 1 being 100. The larger value indicates the higher run-flat durability.

The detailed measuring conditions are as follows.
 wheel rim: 17×8 J
 inner pressure when measured: 0 kPa (valve core was removed from rim)
 vertical load: 4.14 kN
 drum radius: 1.7 m
 speed: 80 km/h Incidentally, prior to the test, each test tire was, after mounted on a rim, applied by an inner pressure of 230 kPa, and kept in an atmosphere of 38+/−3 deg.C for 34 hours.

<Uniformity>

The radial force variation (RFv) of the test tire was measured with a tire uniformity tester. RFV is a fluctuating force of the load in the up and down direction occurring on the tire rotational axis.

The results are index numbers based on the value of the comparative example 1 being 100. The smaller value indicates the better uniformity.

The detailed measure conditions are as follows.
 inner pressure: 200 kPa
 vertical load: 4.88 kN
 tire rotation number: 60 rpm <Defective Fraction of Appearance of Tire Inner-cavity Surface>

For 200 samples per each test tire, the tire inner-cavity surfaces were visually checked, and the percentage of the tires having defective appearance due to the air remained during vulcanization was computed.

The results are index numbers based on the value of the comparative example 1 being 100. The smaller value is better.

TABLE 1

|  | comparative example 1 | comparative example 2 | embodiment 1 | embodiment 2 | embodiment 3 | embodiment 4 | embodiment 5 | embodiment 6 | embodiment 7 | embodiment 8 | embodiment 9 |
|---|---|---|---|---|---|---|---|---|---|---|---|
| method for molding tire inner cavity(*) | A | A | A | A | A | A | A | A | A | A | A |
| total surface area S1 of smooth surface in side inner-cavity surface/total area Ss of side inner-cavity surface (%) | 68.0 | 84.0 | 96.0 | 98.0 | 99.0 | 100.0 | 91.0 | 96.0 | 98.0 | 91.0 | 96.0 |
| total surface area S2 of smooth surface in tread inner-cavity surface/total area St of tread inner-cavity surface (%) | 68.0 | 84.0 | 96.0 | 98.0 | 99.0 | 100.0 | 91.0 | 96.0 | 98.0 | 84.0 | 84.0 |
| total surface area S3 of smooth surface in bead inner-cavity surface/total area Sb of bead inner-cavity surface (%) | 68.0 | 84.0 | 96.0 | 98.0 | 99.0 | 100.0 | 91.0 | 96.0 | 98.0 | 84.0 | 84.0 |
| total surface area S4 of smooth surface in reinforcing layer inner-cavity surface/total area Sr of reinforcing layer inner-cavity surface (%) | 68.0 | 84.0 | 96.0 | 98.0 | 99.0 | 100.0 | 91.0 | 96.0 | 98.0 | 88.0 | 90.0 |
| side-reinforcement rubber layer's inner end height H3/inner-cavity height H (%) | 10.0 | 10.0 | 10.0 | 10.0 | 10.0 | 10.0 | 10.0 | 15.0 | 15.0 | 10.0 | 10.0 |
| side-reinforcement rubber layer's outer end height H4/inner-cavity height H (%) | 95.0 | 95.0 | 95.0 | 95.0 | 95.0 | 95.0 | 95.0 | 90.0 | 90.0 | 95.0 | 95.0 |
| run-flat durability (index) | 100 | 102 | 111 | 114 | 114 | 114 | 108 | 111 | 114 | 108 | 111 |
| uniformity (index) | 100 | 101 | 118 | 122 | 126 | 135 | 110 | 107 | 115 | 104 | 108 |
| appearance defective fraction (index) | 100 | 103 | 134 | 154 | 176 | 208 | 112 | 116 | 133 | 109 | 121 |

|  | embodiment 10 | embodiment 11 | embodiment 12 | embodiment 13 | embodiment 14 | embodiment 15 | embodiment 16 | embodiment 17 | embodiment 18 | embodiment 19 |
|---|---|---|---|---|---|---|---|---|---|---|
| method for molding tire inner cavity(*) | A | A | A | A | A | A | B | B | B | B |
| total surface area S1 of smooth surface in side inner-cavity surface/total area Ss of side inner-cavity surface (%) | 96.0 | 96.0 | 96.0 | 96.0 | 96.0 | 98.0 | 96.0 | 98.0 | 99.0 | 100.0 |
| total surface area S2 of smooth surface in tread inner-cavity surface/total area St of tread inner-cavity surface (%) | 88.0 | 92.0 | 84.0 | 84.0 | 96.0 | 96.0 | 96.0 | 98.0 | 99.0 | 100.0 |
| total surface area S3 of smooth surface in bead inner-cavity surface/total area Sb of bead inner-cavity surface (%) | 84.0 | 84.0 | 83.0 | 87.0 | 90.0 | 90.0 | 96.0 | 98.0 | 99.0 | 100.0 |
| total surface area S4 of smooth surface in reinforcing layer inner-cavity surface/total area Sr of reinforcing layer inner-cavity surface (%) | 90.5 | 91.0 | 88.0 | 91.0 | 95.0 | 97.0 | 96.0 | 98.0 | 99.0 | 100.0 |
| side-reinforcement rubber layer's inner end height H3/inner-cavity height H (%) | 10.0 | 10.0 | 10.0 | 10.0 | 10.0 | 10.0 | 10.0 | 10.0 | 10.0 | 10.0 |

TABLE 1-continued

| | | | | | | | | | | |
|---|---|---|---|---|---|---|---|---|---|---|
| side-reinforcement rubber layer's outer end height H4/ inner-cavity height H (%) | 95.0 | 95.0 | 95.0 | 95.0 | 95.0 | 95.0 | 95.0 | 95.0 | 95.0 | 95.0 |
| run-flat durability (index) | 111 | 111 | 111 | 111 | 111 | 114 | 111 | 114 | 114 | 114 |
| uniformity (index) | 112 | 115 | 106 | 110 | 114 | 117 | 48 | 48 | 49 | 50 |
| appearance defective fraction (index) | 125 | 129 | 119 | 123 | 130 | 142 | 73 | 74 | 76 | 78 |

(*)"A" was molded by the use of a vulcanization bladder. "B" was molded by the use of the rigid core.

As apparent from Table 1, it was confirmed that the Embodiment run-flat tires were significantly improved in the run-flat durability in comparison with the comparative examples.

EXPLANATION OF THE SYMBOLS 2 tread portion
3 sidewall portion
4 bead portion
5 bead core
6 carcass
10 side-reinforcement rubber layer
11 tire inner-cavity surface
12 side inner-cavity surface
15 smooth surface

The invention claimed is:

1. A run-flat tire comprising:
a carcass extending from a tread portion through a sidewall portion to a bead core in a bead portion,
a side-reinforcement rubber layer disposed axially inside the carcass in the sidewall portion and having a substantially crescent-shaped cross-section, and
a tire inner-cavity surface provided with convexed ribs, wherein,
in a tire meridian cross section including the tire rotational axis under a normal state such that the tire is mounted on a normal rim, inflated to a normal internal pressure and loaded with no load, the tire inner-cavity surface includes
a radial height H of a radially outermost position of the tire inner-cavity surface measured in a tire radial direction from a bead toe of the bead portion,
a side inner-cavity surface defined as extending from a first radial height of 0.4 times H to a second radial height of 0.9 times H,
a tread inner-cavity surface defined as extending radially outwardly from the second radial height to the radial height H, and
a bead inner-cavity surface defined as extending radially inwardly from the first radial height to the bead toe, wherein
with respect to the smooth surface of the tire inner-cavity surface other than the convexed ribs, the percentage of the area of the smooth surface of the side inner-cavity surface to the overall area of the side inner-cavity surface,
the percentage of the area of the smooth surface of the tread inner-cavity surface to the overall area of the tread inner-cavity surface, and
the percentage of the area of the smooth surface of the bead inner-cavity surface to the overall area of the tread inner-cavity-surface
satisfy the following relationship:
side inner-cavity surface>tread inner-cavity surface>bead inner-cavity surface,
wherein the bead inner-cavity surface is provided with the convexed ribs not extending into the side inner-cavity surface, and the tread inner-cavity surface is provided with the convexed ribs not extending into the side inner-cavity surface, whereby the side inner-cavity surface is not provided with the convexed ribs.

2. The run-flat tire according to claim 1, wherein the total surface area of the smooth surface of the side inner-cavity surface is 100% of the total area of the side inner-cavity surface.

3. The run-flat tire according to claim 1, wherein
the tire inner-cavity surface is formed with a rigid core having an outer surface which substantially accords with the shape of the tire inner-cavity surface, and
the rigid core is constructed by successively arranging segments divided in the tire circumferential direction.

4. The run-flat tire according to claim 1, wherein the side-reinforcement rubber layer is disposed in a range from 0.15 times to 0.9 times the radial height H from the bead toe.

5. The run-flat tire according to claim 2, wherein
the tire inner-cavity surface is formed with a rigid core having an outer surface which substantially accords with the shape of the tire inner-cavity surface, and
the rigid core is constructed by successively arranging segments divided in the tire circumferential direction.

6. A run-flat tire comprising:
a carcass extending between bead portions through a tread portion and sidewall portions,
a side-reinforcement rubber layer disposed axially inside the carcass in each of the sidewall portions and having a substantially crescent-shaped cross-section, and
a tire inner-cavity surface provided with convexed ribs, wherein,
in a tire meridian cross section including the tire rotational axis under a normal state such that the tire is mounted on a normal rim, inflated to a normal internal pressure, and loaded with no load,
the tire inner-cavity surface has a radially outermost position having a radial height H measured in a tire radial direction from bead toes of the bead portions, and
the tire inner-cavity surface includes
a pair of side inner-cavity surfaces defined as extending from a first radial height of 0.4 times the radial height H to a second radial height of 0.9 times the radial height H,
a tread inner-cavity surface defined as defined as extending between the side inner-cavity surfaces, and
a pair of bead inner-cavity surfaces defined as extending radially inwardly from the first radial height to the respective bead toes,
wherein
the bead inner-cavity surfaces are provided with the convexed ribs not extending into the side inner-cavity surfaces, and the tread inner-cavity surface is provided with the convexed ribs not extending into the side inner-cavity surfaces, whereby the side inner-cavity surfaces are not provided with the convexed ribs.

7. The run-flat tire according to claim 2, wherein the side-reinforcement rubber layer is disposed in a range from 0.15 times to 0.9 times the radial height H from the bead toe.

8. The run-flat tire according to claim 6, wherein the side-reinforcement rubber layer is disposed in a range from 0.15 times to 0.9 times the radial height H from the bead toe.

9. The run-flat tire according to claim 3, wherein the side-reinforcement rubber layer is disposed in a range from 0.15 times to 0.9 times the radial height H from the bead toe.

10. The run-flat tire according to claim 6, wherein
the tire inner-cavity surface is formed with a rigid core having an outer surface which substantially accords with the shape of the tire inner-cavity surface, and
the rigid core is constructed by successively arranging segments divided in the tire circumferential direction.

* * * * *